United States Patent [19]

Betts

[11] 3,793,195

[45] Feb. 19, 1974

[54] COATED BEARING SURFACES

[75] Inventor: Robert Keith Betts, Cincinnati, Ohio

[73] Assignee: General Electric Company, Cincinnati, Ohio

[22] Filed: Oct. 10, 1972

[21] Appl. No.: 296,032

Related U.S. Application Data

[63] Continuation-in-part of Ser. No. 86,078, Nov. 2, 1970, abandoned.

[52] U.S. Cl.................. 252/12, 29/195, 308/241
[51] Int. Cl................................ C10m 7/06
[58] Field of Search ......... 252/12; 308/241, DIG. 9; 29/195 R

[56] References Cited
UNITED STATES PATENTS

| | | | |
|---|---|---|---|
| 2,387,872 | 10/1945 | Bell............................. | 308/DIG. 9 |
| 3,075,279 | 1/1963 | Haltner et al.................. | 29/195 |
| 3,143,383 | 8/1964 | Bamberger et al............. | 308/241 |
| 3,194,759 | 7/1965 | Devine et al................... | 252/12 |

Primary Examiner—Daniel E. Wyman
Assistant Examiner—J. Vaughn
Attorney, Agent, or Firm—Lee H. Sachs; Derek P. Lawrence

[57] ABSTRACT

Improvment in the wear resistance of surfaces which bear and slide one on the other is achieved by coating at least one, and preferably both, of such surfaces with a base coating of a shear promoting alloy, for example, Cu—Ni—In or Cu—Co—In and then applying to both surfaces a low friction coating of a sulfide of an element from the group Mo, W and their mixtures.

5 Claims, No Drawings

COATED BEARING SURFACES

This application is a continuation-in-part of application, Ser. No. 86,078, filed Nov. 2, 1970 and now abandoned.

BACKGROUND OF THE INVENTION

In general, wear can be described as the progressive loss of material from rubbing surfaces. The rate and effect of such removal depends on many factors relating to properties of the material at the rubbing surfaces, environmental conditions and the tolerance of the mechanical device including such surfaces to accept material loss from its component. Because wear can lead to component fatigue failure induced by failure of contacting surfaces, wear at the interface between assembled jet engine components particularly those rotating at high speeds, draws significant attention.

One approach for preventing wear at the interface between such components is described in U.S. Pat. No. 3,143,383 — Bamberger et al. That patent is directed particularly to wear improvement between contacting surfaces of iron, nickel, cobalt, the refractory metals or their alloys. However, with the advancement of jet engine and metallurgical technology, titanium alloys have been introduced into certain jet engine components. Now, not only are there high performance requirements for the superalloys and refractory metal alloys but also the special problems associated with titanium wear have been introduced.

SUMMARY OF THE INVENTION

It is a principal object of the present invention to provide an improved coating system on opposed article surfaces bearing on one another which system protects the article surface from wear and consequent loss of fatigue life while at the same time allows low friction movement between the surfaces.

Another object is to provide for titanium or titanium alloys such a coating system which is a composite, on at least one of such surfaces, of a shear promoting base coating and a low friction coating on both of such surfaces, so that the low friction coatings contact one another and the base coating on at least one of the surfaces beneath the low friction coating absorbs effects of relative motion between the surfaces.

These and other objects and advantages will be more fully understood from the following detailed description of the preferred embodiments which are meant to be typical of, rather than limiting on, the scope of the invention.

Briefly, the present invention provides, in a plurality of members in contact one with another at opposed bearing portions, the combination of a base coating bonded to at least one of, and preferably both of, such bearing portions and comprising a shear promoting alloy of Cu, an element selected from Co and Ni and including the metallic element In, the oxide of which provides internal lubrication characteristics; and a low friction coating applied as a top coating over each of the bearing portions. The low friction coating includes a sulfide of the chemically related elements of the group Mo, W and their mixtures. The members bear one on the other through the low friction coating.

DESCRIPTION OF THE PREFERRED EMBODIMENT

The fatigue life of titanium articles has been known to be seriously reduced when in contact with one another under high pressure sliding wear conditions without adequate protection. For example, such action can occur at the juncture between blade dovetails and wheel slots of jet engine compressors. Though some coatings protect such articles for relatively short periods of time, once wear-through occurs, article fatigue life is reduced rapidly at the area of wear.

One coating material presently used to inhibit such wear on one of a plurality of such bearing surfaces is a Cu-Ni base alloy which includes In to function, at least in part, as an alloy internal lubricant. In one form, the material includes, by weight, about 20 – 40% Ni, about 2 – 10% In, with the balance essentially Cu.

As will be seen in the wear test data presented later, such a coating alone provided inadequate protection when applied only to one surface of bearing Ti or Ti alloys. Surface damage from wear resulted in a 25 – 30 percent loss of alternating stress capability. Furthermore, such a coating applied to both surfaces in mutual contact was also inadequate, resulting in severe adhesive wear because of the mutually soluble, similar metals.

In an evaluation of the galling resistance of coatings under high crush-stress and displacement of the type found in the fan portion of advanced turbofan engines, a forged titanium base alloy including nominally 6% Al and 4% V was tested.

This evaluation employed reduced section specimens rubbed at room temperature and 50,000 psi contact pressure by reciprocal motion between a specimen and a pressure wear shoe. After rubbing for the selected number of cycles, the specimen was tested for fatigue strength to determine any loss. The specimens were 2 inches × 6 inches × ¼ inch flat reduced section plates which were low stress ground and shot peened prior to any coating. As shown by the data of the following Table I, none of the samples in the various combinations tested with a variety of coating materials on either or both the pressure wear shoe and the specimen adequately protected the specimen from wear.

TABLE I

| Example | Coating | | Thickness (mils) | Galling 10³ Cycles | Wear — Remarks |
| --- | --- | --- | --- | --- | --- |
| | Shoe | Specimen | | | |
| 1 | none | none | — | 10 | severe, metal flaking |
| 2 | none | Cu 35 Ni 5 In | 7 | 25 | shoe severe, coating damaged |
| 3 | none | 75 Ni 25 graphite | 6 | 24 | shoe severe, coating damaged |
| 4 | none | 75 Ni 25 Ag | 6 | 13 | shoe severe, coating damaged |
| 5 | none | Graphite | 2 | 3 | severe — shoe and specimen |
| 6 | none | I₂ grease | | 6 | severe — shoe and specimen |
| 7 | none | Polyurethane | 7 | 7 | moderate, coating removed |
| 8 | none | WC-12Co+Mo S₂ | 3 | 5 | shoe severe |
| 9 | none | PTFE(a) | 3 | 10 | severe, coating worn |
| 10 | 80 Ni 20 Ag | 80 Ni 20 Ag | 6 | 4 | severe, coating flaked |

TABLE I — Continued

| Example | Coating Shoe | Specimen | Thickness (mils) | Galling 10³ Cycles | Wear — Remarks |
|---|---|---|---|---|---|
| 11 | Cu 35 Ni 5 In | Cu 35 Ni 5 In | 6 | 25 | localized — severe |
| 12 | PTFE (a) | PTFE (a) | 3 | 25 | localized — severe |
| 13 | 60 Cu 40 Ni | 60 Cu 40 Ni | 3 | 18 | coating rough, galled 1 end |
| 14 | Cu 35 Ni 5 In | WC-12Co+Mo S₂ | 2 | 38 | 1 end; WC flaked coating rough |

(a) polytetrafluoroethylene

A major wear situation which confronts the use of such titanium base alloys in a high mass component such as the fan of a turbo fan engine is the wear of the dovetail pressure faces as the fan blades seat and unseat in response to engine speed. Specifically, hoop stresses cause the wheel to grow circumferentially and the dovetail slots to expand and later contract thereby allowing the dovetail to slide with the relative motion of about 0.005 inch across the pressure faces. This occurs generally twice during a flight: once during take off and once during thrust reverse upon landing. Therefore, an additional series of tests was conducted to evaluate fatigue effects on samples subjected to increments of prior wear up to 10,000 cycles. Samples to be coated were first grit blasted then flame sprayed with a Cu-35% Ni-5% In alloy after which a low friction coating of the dichalcogenide Mo S₂ was applied to selected samples. When coated, the specimen and mating wear shoes were prepared in the same way. Samples were rubbed under a pressure of 50,000 psi with a 0.006 inch stroke at 60 strokes per minute.

The coating of Cu-35% Ni-5% In, unlubricated with the low friction Mo S₂ coating, when rubbed against uncoated titanium alloy, represented by Examples 16 and 19, resulted in a friction coefficient of about 0.6. By comparison, the specimens and shoes each coated with a base coat of the Cu-Ni-In alloy and then coated with the low friction Mo S₂ coating, represented by Examples 17, 20 and 21, had friction coefficients on only 0.02 – 0.04 through 10,000 cycles of rubbing. The specimens, represented by Examples 15 and 18, subjected to wear with no coating all exhibited galling with severity increasing between 1,000 and 5,000 wear cycles. Photomicrographic studies indicated surface cracks which emanate from the galling damaged area on all such wear specimens. Accordingly, the samples represented by Examples 15 and 18, as well as those represented by Examples 16 and 19, including a coating of the Cu-Ni-In alloy only on specimens rather than on the shoe and with no low friction coating, showed very early fatigue failure.

Coated samples with Mo S₂ lubricant over the Cu-

TABLE II

Avg. Test Data — preworn samples Coating thickness nominally 0.006 inch

| Example | Coating* | Prior Wear Cycles | Fric. Coef. | Wear surface appearance | Bonding Stress 10³ psi | 10³ Cycles to Failure |
|---|---|---|---|---|---|---|
| 15 | none | 1000 | 0.62 | moderately scuffed | 35 | 65 |
| 16 | 1A | 1000 | 0.58 | coat flaked; spec. scuffed | 45 | 39 |
| 17 | 2AB | 1000 | 0.02 | lightly striated | 45 | 4700 |
| 18 | none | 5000 | 0.68 | moderately galled | 40 | 34 |
| 19 | 1A | 5000 | 0.59 | coat flaked;spec. galled | 45 | 21 |
| 20 | 2AB | 5000 | 0.04 | lightly striated | 45 | 6500 |
| 21 | 2AB | 10,000 | 0.04 | lightly striated | 45 | 6090 |

* key: 1=Specimen only; 2=Shoe and Specimen; A=Cu 35 Ni 5 In base coat; B=Mo S₂ top coat The wear surface appearance in Table II describes the specimens as "striated," "scuffed" or "galled." These are terms which relate to increasing severity of apparent superficial wear damage. Striated specimens appeared to be the least worn, having only shallow streaking of the surfaces to indicate relative motion. Scuffing gives the impression of slight metal loss in addition to wear striations. Galling may be described as a form of wear resulting in scouring, tearing and transfer of surface material under alternating motion. The basic wear mechanism, adhesion, is clearly active in producing the effect described although the other mechanisms, abrasion, corrosion, and surface fatigue are involved to a lesser extent.

Friction data in Table II clearly show the lubricating benefit of the dichalcogenide Mo S₂. The uncoated samples, represented by Examples 15 and 18 exhibited an average coefficient of friction of 0.65 with the average for 1,000 cycles of 0.62 and for 5,000 cycles 0.68. Because of the galling and scuffing on these uncoated samples, no uncoated samples were further tested up to 10,000 cycles.

Ni-In coating, by contrast, exhibited only uniform lightly striated wear surfaces with no visible evidence of substrate damage regardless of the exposure to at least 10,000 wear cycles. When such titanium surfaces were examined after the coatings were chemically removed, they were found to be completely protected from damage through at least 10,000 wear cycles.

When no Mo S₂ was applied to the base coating, the coating seized, adhered to the non-lubricated coated shoe and was stripped from the specimen in fewer than 10,000 cycles. Significant wear of the titanium alloy surface was observed after stripping of the coating from such samples. This accounts for the fatigue loss which was as severe as with the intentionally uncoated titanium samples.

The high cycle fatigue testing reported in Table II was conducted under 40,000 psi mean tensile stress with alternating bending stress to failure. These data revealed that the grit blasting and subsequent coating did not affect the base line fatigue strength of the alloy under the test conditions. Also, it was found that the combination of a first coating bonded with both of the bearing surfaces of a Cu-Ni-In alloy covered with the low friction dichalcogenide, represented by Mo $S_2$, afforded complete surface protection for at least 10,000 cycles prior wear based on fatigue strength preservation. Also revealed was the fact that wear damage to titanium surfaces rubbed against titanium for non-lubricated base coats of the type tested severely reduced the high cycle endurance capability. Thus the combination tested, which represents the preferred form of the present invention, provides a very effective wear protection system. It forms an adequate bond with the titanium substrate to prevent any rubbing of the titanium surfaces. In addition, it appears to provide in the base coating of a "shear promoting alloy" a relatively soft, lamellar-structured intermediate layer tending to equalize contact stress across the pressure face. Furthermore, such base coating also may yield internally under low amplitude cyclic shear stresses to minimize relative motion at the coating surfaces. The presence of a lubricative oxide provided by the lower melting In appears to contribute to these characteristics.

In still another series of tests, additional base coating materials as well as other secondary or low friction type coatings were evaluated. In these tests, the base coating was applied to no more than one of the two rubbing components and the same low friction coating was applied to both rubbing components so that the two components rubbed one on the other through the low friction coating.

juncture between fan dovetails and wheels in a fan jet engine, not only was the coefficient of friction relatively high, as shown by Example 25, but also there was severe galling of the wear surfaces. In addition, testing of the specimen after wear cycling showed a drastic reduction in specimen fatigue life.

Frequently, the friction coefficient between rubbing surfaces is used as a measure of the value of coating or coating systems to protect underlying article surfaces from wear and consequent loss of fatigue strength. However, it has now been recognized that such data can sometimes be misleading and that actual fatigue life data must be used to fully evaluate such coatings or systems.

Another series of tests was conducted to evaluate the equivalency of sulfide of tungsten to sulfide of molybdenum at various temperatures under rubbing conditions. Shoe specimens of the titanium base alloy including nominally 6% Al and 4% V were first coated with a Cu-Co-In alloy base coat in the range, by weight, of 20 – 40% Co, 2 – 10% In with the balance essentially Cu. More specifically in this series, the composition was nominally 35% Co, 5% In, balance Cu. Application to the shoe specimens was by flame spray.

Low friction coatings were then applied over the base coating in various groupings of specimens, a $MoS_2$ coating over one group and a $WS_2$ coating over another. The method of applying the $WS_2$ was by plasma spray which deposited a coating of 0.005 inch nominal

TABLE III

Bending Stress: 45,000 psi Coating thickness nominally 0.006 inch

| Example | Average Friction Coefficient | | Coating (1) | | Wear Surface Appearance | Avg. $10^3$ Cycles to Failure |
|---|---|---|---|---|---|---|
| | 5000 cyc. | 10,000 cyc. | Spec. | Shoe | | |
| 22 | No | No | None | None | — | 1116 |
| 23 | 0.25 | 0.3 | B | B | galled | 59 |
| 24 | 0.01 | 0.01 | B* | AB | shallow spots | 3500 |
| 25 | 0.23 | — | C* | AC | severe galling | 166 |
| 26 | 0.02 | — | B* | DB | few galled spots | 188 |
| 27 | 0.18 | — | B* | EB | severe galling | 105 |

* Vapor honed to hold coating
(1) key: A=Cu-35 Ni-5 In base coat; B=Mo $S_2$ top coat; C=graphite top coat; D=60 Cu-40 Ni base coat; and E=Ni-18 Al base coat.

Although the double-surface combination Cu-35% Ni-5% In/Mo $S_2$ system, represented by Examples 17, 20 and 21 of Table II, is the preferred form of the present invention because of the full protection it affords the base surface, the summarized data of Table III show the benefit of another form of the present invention for certain applications as shown by Example 24. In that Example, the rubbing of Mo $S_2$ coated surfaces, with a single base coat of the Cu-Ni-In alloy on the shoe, protected the specimen for up to 10,000 cycles as shown by the fatigue life. Of significant interest in connection with this series of tests is the fact that, as shown by Example 26, a low coefficient of friction does not necessarily mean that there is or will be no damage to the underlying base metal. In Example 26, there is a significant reduction in fatigue life of the specimen even though the friction coefficient is very low.

This series of tests, represented by the data of Table III, compared three base coatings along with the low friction coatings of the dichalcogenide type represented by Mo $S_2$ and the widely used solid film lubricant graphite. It should be noted that under the conditions of this testing, simulating those experienced at the thickness.

The shoes were tested with the same Ti base alloy as an opposed stationary block in 400°F tests at 400 cycles per second under 1,000 psi with 0.005 inch double amplitude movement for 20 hours to simulate sheet metal rubbing wear conditions.

The conclusion from these tests was that the $WS_2$ coating was equivalent to or better than $MoS_2$ coatings at 400°F, although $WS_2$ did not perform as well in other tests at 650°F.

The present invention recognizes that protection can be afforded rubbing surfaces through the application to at least one of the surfaces, and much more preferably to both of the surfaces, of a copper-nickel or a copper-cobalt base alloy including an alloying element which functions as does In, each rubbing surface finally being covered with a sulfide selected from Mo, W and their mixtures. In this way, the sulfide surfaces rub one on the other and the article surface is cushioned from relative motion damage through a shear promoting Cu Ni or Cu Co base alloy.

What is claimed is:

1. In a plurality of members in contact one with another at opposed bearing portions, the combination of:
- a base coating bonded with at least one of the bearing portions and comprising an alloy of Cu, In and an element selected from the group consisting of Co and Ni; and
- a low friction coating applied as a top coating over each of the bearing portions, the low friction coating including a sulfide of an element selected from the group consisting of molybdenum, tungsten and their mixtures, the members bearing one on the other through the low friction coating.

2. The combination of claim 1 in which the base coating alloy consists essentially of, by weight, about 20 – 40 percent of an element selected from the group consisting of Co and Ni, about 2 – 10% In, with the balance Cu.

3. The combination of claim 2 in which the base coating alloy consists essentially of, by weight, about 20 – 40% Ni, about 2 – 10% In, with the balance Cu.

4. The combination of claim 3 in which the sulfide is $MoS_2$.

5. The combination of claim 4 in which the sulfide is $WS_2$.

* * * * *